No. 619,982. Patented Feb. 21, 1899.
C. D. McCOMBS & T. J. PARKINSON.
REIN HOLD ADJUSTER.
(Application filed Jan. 15, 1898.)
(No Model.)
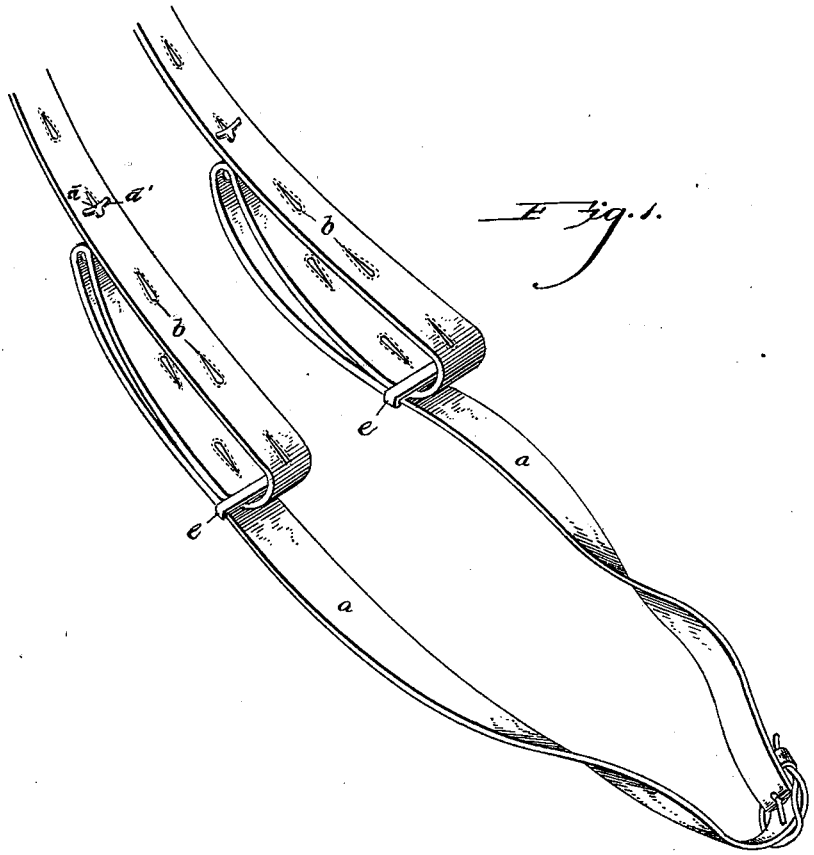
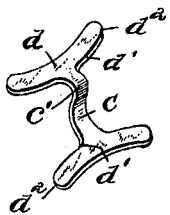
WITNESSES:
J. P. Appleman.
Burt Conger.
INVENTORS.
C. D. McCombs.
T. J. Parkinson.
BY
N. C. Evert & Co.
ATTORNEYS
THE NORRIS PETERS CO., PHOTO-LITHO., WASHINGTON, D. C.

UNITED STATES PATENT OFFICE.

CORNELIUS D. McCOMBS AND THOMAS J. PARKINSON, OF PITTSBURG, PENNSYLVANIA.

REIN-HOLD ADJUSTER.

SPECIFICATION forming part of Letters Patent No. 619,982, dated February 21, 1899.

Application filed January 15, 1898. Serial No. 666,764. (No model.)

*To all whom it may concern:*

Be it known that we, CORNELIUS D. MC-COMBS and THOMAS J. PARKINSON, citizens of the United States of America, residing at Pittsburg, in the county of Allegheny and State of Pennsylvania, have invented certain new and useful Improvements in Adjustable Rein-Holders, of which the following is a specification, reference being had therein to the accompanying drawings.

This invention relates to certain new and useful improvements in adjustable rein-holders, and has for its object to provide novel and effective means for forming gripping-loops at any desired point upon the reins or lines.

The principal features of our invention reside in an adjustable and removable S-shaped shank having transversely-extending bars formed integral with each end, which is employed in connection with a pair of reins or lines provided throughout a portion of their length with oblong slits, forming eyes for the reception of the S-shaped shank having transversely-extending bars formed integral with each end, forming a means for fastening the two strands after they have been doubled to form the loop in the reins or lines, and which is adapted to enable the driver to obtain a firm grip on the reins.

The specific construction and arrangement of our invention will be hereinafter more fully described, and particularly pointed out in the claim, and in describing the invention in detail reference will be had to the accompanying drawings, forming a part of this specification and wherein like letters of reference indicate similar parts throughout both views, in which—

Figure 1 is a perspective view of a pair of reins or lines, showing the application of our improved fastening device. Fig. 2 is a perpective view of our adjustable rein-holder.

To put our invention into practice, we provide the reins or lines $a$ throughout any desirable portion of their length with the oblong slots or eyes $b$, the leather or other material of which the reins are composed being, if desired, sewed around the edges of the eyes in order to strengthen the same and prevent their becoming injured. The portion of the reins that is provided with the oblong eyes is doubled upon itself, as is shown in Fig. 1, and the gripping-loops formed by means of the S-shaped shank having transversely-extending bars formed integral with each end having transversely-extending or T-shaped heads or bars $d$, made slightly segmental in form, so as to present the convex edges $d'$ into engagement with the surface of the reins, and in order to permit the fastening device to lie in close engagement with the two strands of the reins that are formed by doubling the same we preferably provide a hump or curve $c'$ on the shank of the fastening device, as illustrated in the perspective view in Fig. 2.

The ends $d^2$ of the fastening device are preferably rounded, so as to obviate the cutting-surface of the same.

The double strand that is formed by making the loop in the reins is preferably bound together at the point where the loop is gripped by the hand by a keeper $e$, which engages the hand-strand of the loop and the strand of the reins that is passed backward from the loop for buckling. This keeper serves to prevent the upward rising of the loop or grip and serves to hold the same in its position on the rein, so that the hand may be rigidly engaged in the same when desired.

Although we have shown our improved fastening device applied as a rein-holder in the accompanying drawings, it will readily be observed that the same being portable, it may be easily carried in the vest-pocket when not in use, and should a trace or any other portion of the harness become broken it can be used as a fastener for the same, and thereby hold the parts until they can be repaired.

Another application to which the fastener could be placed would be for fastening heavy canvas awnings or similar material, as well as leather and the like, and thereby obviate the pinning and lacing ordinarily necessary.

By forming the shank $c$ with the hump or curve $c'$ the two heads $d$ are placed on different relative planes, which permit the same to lie in close engagement with the strands of the reins. This peculiar style of shank is therefore the preferred form of our construction.

Having fully described our invention, what we claim as new, and desire to secure by Letters Patent, is—

In combination with a pair of reins, a holding device comprising an S-shaped shank, a bar formed integral with each end of said shank and extending transversely thereof, said bars being on different relative planes and having their inner edges rounded, substantially as shown and described.

In testimony whereof we affix our signatures in the presence of two witnesses.

CORNELIUS D. McCOMBS.
   THOMAS J. PARKINSON.

Witnesses:
 JOHN NOLAND,
 WILLIAM E. MINOR.